United States Patent [19]

Castelli et al.

[11] 4,286,988

[45] Sep. 1, 1981

[54] COPPER BASE ANTIFOULING PAINTS WITH PH CONTROL

[75] Inventors: Vincent J. Castelli, Severna Park; Eugene C. Fischer, Arnold, both of Md.

[73] Assignee: The United States of America as represented by the Secretary of the Navy, Washington, D.C.

[21] Appl. No.: 164,450

[22] Filed: Jun. 30, 1980

[51] Int. Cl.$^3$ .............................................. C09D 5/14
[52] U.S. Cl. .................................. 106/15.05; 106/16; 106/18; 106/18.33; 424/140
[58] Field of Search ................. 106/16, 17, 18, 15.05, 106/18.33; 424/140, 143

[56] References Cited

U.S. PATENT DOCUMENTS

| | | | |
|---|---|---|---|
| 444,665 | 1/1891 | Dennys | 106/17 |
| 2,989,407 | 6/1961 | Francis | 106/17 |
| 3,033,809 | 5/1962 | Saroyan et at. | 106/16 |
| 3,337,352 | 8/1967 | Sano et al. | 106/16 |

*Primary Examiner*—Lorenzo B. Hayes
*Attorney, Agent, or Firm*—R. S. Sciascia; A. L. Branning; R. D. Johnson

[57] ABSTRACT

Conventional Copper based antifouling paints are improved by adding from 0.001 to 20.0 weight percent based on the weight of the Cuprous ion source of an additive compound which
 (A) will give a positive acid test to litmus paper in distilled water;
 (B) is at least slightly soluble in sea water; and
 (C) does not react quickly with cuprous ions in sea water to produce precipitates.

12 Claims, No Drawings

COPPER BASE ANTIFOULING PAINTS WITH PH CONTROL

BACKGROUND OF THE INVENTION

This invention relates to antifouling paints and more particularly to cooper base antifouling paints.

Current practice in copper base antifouling paints provides coatings with lifetimes of from 12 to 36 months. This failure of the antifouling coating with the subsequent attachment of marine organisms appears to occur because the toxin is prevented from being leached by a barrier of insoluble copper salts.

Current practice for renewing old antifouling coatings has concentrated on the mechanical action of brushes and such to physically remove the insoluble layers. This results in concurrent high cost and high labor intensity by specialized personnel (divers).

SUMMARY OF THE INVENTION

Accordingly, an object of this invention is to improve the performance of copper base antifouling paints.

Another object of this invention is to increase the effective life of copper base antifouling compounds.

A further object of this invention is to reduce the frequency at which ships must be scraped or repainted.

Still another object of this invention is to reduce or prevent the formation of coatings of water insoluble copper salts on the ship.

These and other objects of this invention are accomplished by providing an improved copper base antifouling paint by adding to a conventional copper based antifouling paint from 0.001 to 20.0% weight percent, based on the weight of the cuprous ion source in the paint, of an additive compound which
(A) will give a positive acid test to litmus paper in distilled water;
(B) is at least slightly soluble in sea water; and
(C) does not react quickly with cuprous ions in sea water to produce precipitates.

DETAILED DESCRIPTION OF THE PREFERRED EMBODIMENT

When cuprous ions ($Cu^+$) come into contact with sea water, certain insoluble salts such as $Cu_2CO_2$ and $CuOCl$ are precipitated. These precipitated salts clog and block the microsized channels through which the antifouling cuprous compound is leached from the antifouling coating. This precipitation can be reduced or prevented by maintaining a pH of less than 7.0 for the sea water in contact with and extending for a few microns out from the surface of the coating. As a result, the useful life of the coating can be substantially increased.

Control of the pH of the sea water is accomplished by the addition of an additive compound to the original uncured paint or resin. Either an organic or inorganic additive compound may be used provided that it possesses the following characteristics. First, it must give a positive acid test to litmus paper in distilled water. Second, the additive compound must be at least slightly soluble in sea water. These two requirements are necessary for the additive compound to create the necessary pH of less than 7 in the microsized channels and along the surface of the coatings.

Furthermore, the additive compound should be compatible with the antifouling paint or resin. For example, the anion of the additive compound should not react with cuprous ions to quickly form insoluble precipitates. A test for this is to mix the additive compound with cuprous ions in water; if a precipitate is detected within a few seconds, the additive compound is unsuitable. Finally, the additive compound should not cause the resin to decompose.

The additive compounds may be used to improve the performance of any of the conventional copper base antifouling paints. Nevertheless, they are preferably used in $Cu_2O$ or $Cu_2S$ based antifouling paints.

The weight of the additive compound [e.g., $(NH_4)_2SO_4$] used is from 0.001 to 20, more preferably from 0.01 to 8, more preferably from 0.03 to 4, and most preferably from 0.1 to 2 percent of the weight of the cuprous ion source (e.g., $Cu_2O$).

The general nature of this invention having been set forth, the following example is present as a specific illustration thereof. It will be understood that the invention is not limited to this specific example but is suceptible to various modifications that will be recognized by one of ordinary skill in the art in view of the teaching of this specification.

EXAMPLE

The copper base antifouling paint used in each of the following runs was in accordance with mil spec MIL-P-15931c, AMENDMENT-1, dated Dec. 19, 1978, formulation 121 for red antifouling paint. The composition of the paint is summarized by table 1 and footnotes.

TABLE 1

Formula No. 121

| Ingredients | Specifications | Pounds[1] Class 1 | Class 2 |
|---|---|---|---|
| Cuprous oxide | MIL-P-15169 | 1440 | 1440 |
| Rosin | LLL-R-626, type I, class A, grade WW or WG | 215 | 215 |
| Vinyl resin[2] | | 55 | 55 |
| Tricresyl phosphate | TT-T-656 | 50 | 50 |
| Methyl isobutyl ketone[3] | TT-M-268 | 165 | — |
| Xylene[3] | TT-X-916 | 115 | — |
| Methyl normal butyl ketone[4] | | — | 272 |
| Antisettling agent[5] | | 5 to 9 | 5 to 9 |

[1]The formula, given slightly in excess of 100 gallons to allow for manufacturing loss, may be proportioned to the size batch desired.
[2]The resin shall be a vinyl chloride-vinyl acetate copolymer. It shall contain 85 to 88 percent vinyl chloride and 12 to 15 percent vinyl acetate. The resin shall have a specific gravity from 1.35 to 1.37. Material shall be furnished as a powdered white solid, not less than 98 percent of which shall pass through a No. 20 sieve, comforming to RR-S-366.
[3]This material shall contain less than 98 percent n-butyl ketone.
[4]The methyl normal butyl ketone shall not be less than 95.0 percent by weight methyl normal butyl ketone, with acidity not more than 0.19 mg. KOH/g sample, color not more than 20 on platinum cobalt scale, and water not more than 0,20 percent by weight.
[5]The antisettling agent shall be sufficient to prevent hard pigment settling.

The additive compound used in these runs was technical grade ammonium sulfate, $(NH_4)_2SO_4$.

A conventional method was used to blend the additive compound with the copper base antifouling paint. The paint, additive compound, and ceramic ball bearings were placed in a ceramic drum which was then turned for 24 hours. Batches of paint containing ⅛, ¼, ½, 1, 2, and 4 weight percent of $(NH_4)_2SO_4$ based on the weight of $Cu_2O$ were prepared.

Test panels were coated with these paints. In addition panels were coated with paint containing no $(NH_4)_2SO_4$ as a control. All of the panels are being subjected to conventional antifouling tests at Miami Florida. The results of these tests are summarized in Table 2. Note that in some cases more than one test panel was used and that the values given in the table are then average values.

TABLE 2

| Time in Months | Percent Antifouling Capacity Weight Percent $(NH_4)_2SO_4$ Added* |  |  |  |  |  |  |
|---|---|---|---|---|---|---|---|
|  | 0 | 1/8 | 1/4 | 1/2 | 1 | 2 | 4 |
| 0 | 100 | 100 | 100 | 100 | 100 | 100 | 100 |
| 2 | 93 | 100 | 100 | 100 | 100 | 100 | 100 |
| 4 | 93 | 100 | 100 | 100 | 100 | 98 | 100 |
| 6 | 93 | 100 | 100 | 100 | 100 | 98 | 100 |
| 8 | 93 | 100 | 100 | 100 | 100 | 98 | 100 |
| 10 | 93 | 100 | 100 | 100 | 100 | 98 | 100 |
| 12 | 83 | 95 | 95 | 95 | 95 | 87 | 87 |
| 14 | 80 | 95 | 93 | 95 | 95 | 87 | 76 |
| 16 | 80 | 95 | 90 | 95 | 95 | 87 | 71 |
| 18 | 79 | 95 | 90 | 95 | 95 | 87 | 71 |
| 20 | 79 | 95 | 90 | 95 | 95 | 87 | 71 |
| 22 | 79 | 95 | 90 | 95 | 95 | 87 | 71 |

*[weight $(NH_4)_2SO_4$ ÷ weight $Cu_2O$] × 100

In general, the addition of the ammonium sulfate, $(NH_4)_2SO_4$, improved the performance of the $Cu_2O$ base paint. An exception was the paint containing 4 percent $(NH_4)_2SO_4$ which performed more poorly that the paint not containing any $(NH_4)_2SO_4$. Moreover, attempts to add 8 percent of $(NH_4)_2SO_4$ to the Formula No. 121 $Cu_2O$ base fouling paint failed. This military paint contains over 70 percent by weight $Cu_2O$, and the resin is not able to hold this additional solid material in suspension. This appears to be the reason that the paint containing 4 percent $(NH_4)_2SO_4$ performed so poorly. It should be noted that commercial anti-fouling paints contain significantly less $Cu_2O$; therefore, this problem should not occur with the commercial paints.

Obviously numerous modifications and variations of the present invention are possible in light of the above teachings. It is therefore to be understood that within the scope of the appended claims the invention may be practiced otherwise than as specifically described herein.

We claim:

1. In a copper base antifouling paint containing a film-forming vehicle and a cuprous source as the toxic agent, the improvement comprising 0.001 to 20 weight percent of $(NH_4)_2SO_4$ based upon the weight of the cuprous source.

2. The antifouling paint of claim 1 wherein the cuprous source is $Cu_2O$.

3. The antifouling paint of claim 1 containing from 0.01 to 8 weight percent of $(NH_4)_2SO_4$ based upon the weight percent of the cuprous source.

4. The antifouling paint of claim 3 containing from 0.03 to 4 weight percent of $(NH_4)_2SO_4$.

5. The antifouling paint of claim 4 containing from 0.1 to 2 weight percent of $(NH_4)_2SO_4$.

6. The antifouling paint of claim 2 containing from 0.01 to 8 weight percent of $(NH_4)_2SO_4$ based upon the weight of $Cu_2O$.

7. The antifouling paint of claim 6 containing from 0.03 to 4 weight percent of $(NH_4)_2SO_4$.

8. The antifouling paint of claim 7 containing from 0.1 to 2 weight percent of $(NH_4)_2SO_4$.

9. The antifouling paint of claim 1 wherein the cuprous source comprises $Cu_2S$.

10. The antifouling paint of claim 9 containing from 0.01 to 8 weight percent of $(NH_4)_2SO_4$ based on the weight of $Cu_2S$.

11. The antifouling paint of claim 10 containing from 0.03 to 4 weight percent of $(NH_4)_2SO_4$.

12. The antifouling paint of claim 11 containing from 0.1 to 2 weight percent of $(NH_4)_2SO_4$.

* * * * *